United States Patent Office 2,727,894
Patented Dec. 20, 1955

2,727,894

ANTHRAQUINONE-ACRIDINE DYESTUFFS

Werner Zerweck, Ernst Honold, and Max Schubert, Frankfurt am Main-Fechenheim, Germany, assignors to Cassella Farbwerke Mainkur Aktiengesellschaft, Frankfurt am Main-Fechenheim, Germany, a German company No Drawing. Application April 13, 1954,
Serial No. 423,001

2 Claims. (Cl. 260—276)

This invention relates to new vat dyestuffs and a process for making same.

It is known from U. S. Patent 2,104,891 to condense 1-aminoanthraquinones with benzthiazole carboxylic acid. The acylaminoanthraquinones thereby obtained are gold-yellow to greenish yellow vat dyestuffs which, however, have found no practical use because of their extreme damaging of the fiber or an insufficient resistance to weather of the dyeings obtained.

We have now found that valuable blue vat dyestuffs are obtained by condensing benzthiazole-6-carboxylic acids, which may be substituted in 2-position, with 3.4-phthalyl-2-aminoacridone. The dyestuffs thus obtained correspond to the general formula

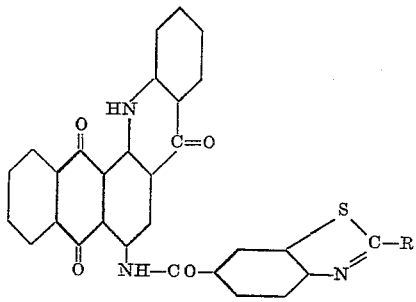

(wherein R means a radical of the group consisting of hydrogen, methyl, phenyl, diphenyl, furyl). They are sufficiently soluble and dye vegetable fibers to blue shades which are outstanding in their fastness to light and resistance to weather. No damaging of the fiber is caused.

The following examples are given for the purpose of illustrating the invention, the parts being by weight and all temperatures in degrees centigrade.

*Example 1*

A solution of 30 parts of 2-phenyl-benzthiazole-6-carboxylic acid chloride is allowed to flow to a suspension of 34 parts of 3.4-phthalyl-2-aminoacridone in 300 parts of dichlorobenzene at 130–150° whilst stirring. The temperature is now raised to 200° and the mass is boiled for about 6 hours under reflux. On cooling, the condensation product is filtered by suction and washed. The dyestuff thus obtained corresponds to the formula

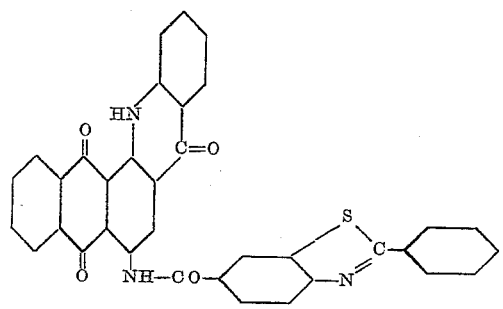

It dissolves in concentrated sulfuric acid with a brown color. The vat is violet colored. Cotton is dyed from a hot vat (according to the IN-procedure common for indanthrene dyestuffs) to very fast blue shades. The fastness to light and resistance to weather are outstanding.

*Example 2*

22 parts of benzthiazole-6-carboxylic acid are converted to the chloride by the aid of thionyl chloride and condensed with 34 parts of 3.4-phthalyl-2-aminoacridone in analogy to Example 1. The condensation product dissolves in concentrated sulfuric acid with a brown-red color. The color of the vat is red-violet. Cotton is dyed from a vat (according to the IW-procedure common for indanthrene dyestuffs) to fast, blue shades. The fastness to light and resistance to weather are very good.

Likewise, for instance, 2-methylbenzthiazole-6-carboxylic acid chloride, 2-diphenyl-benzthiazole-6-carboxylic acid chloride or 2-furylbenzthiazole-6-carboxylic acid chloride may be condensed with phthalyl-aminoacridones to yield blue vat dyestuffs.

We claim:
1. The vat dyestuffs of the general formula

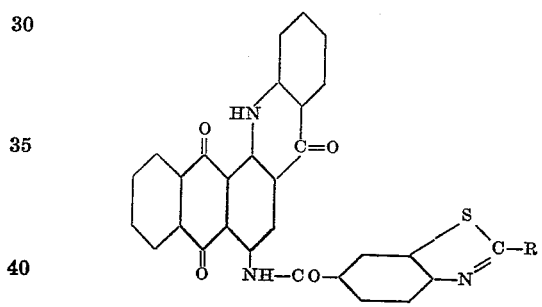

(wherein R means a radical of the group consisting of hydrogen, methyl, phenyl, 2-diphenyl, 2-furyl).
2. The vat dyestuff of the formula

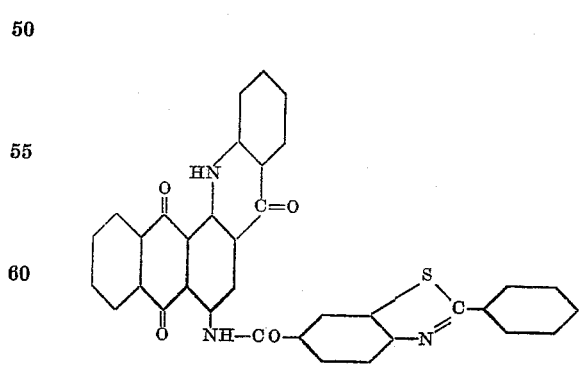

References Cited in the file of this patent

UNITED STATES PATENTS

| | | |
|---|---|---|
| 1,002,270 | Hessenland | Sept. 5, 1911 |
| 2,104,891 | Zerweck et al. | Jan. 11, 1938 |
| 2,408,259 | Holbro et al. | Sept. 24, 1946 |